United States Patent [19]

Takayama

[11] 4,271,534
[45] Jun. 2, 1981

[54] MICROWAVE RECEIVER
[75] Inventor: Akira Takayama, Soma, Japan
[73] Assignee: Alps Electric Co., Ltd., Tokyo, Japan
[21] Appl. No.: 76,154
[22] Filed: Sep. 17, 1979
[30] Foreign Application Priority Data
  Sep. 22, 1978 [JP] Japan .......................... 53-130609[U]
[51] Int. Cl.³ ............................................. H04B 1/06
[52] U.S. Cl. .................................. 455/270; 455/283; 343/701
[58] Field of Search ............... 455/131, 269, 270, 280, 455/281, 283, 284, 292, 323; 343/701, 702, 713

[56] References Cited
U.S. PATENT DOCUMENTS

| 3,246,245 | 4/1966 | Turner | 455/270 |
|---|---|---|---|
| 3,296,536 | 1/1967 | Copeland et al. | 455/270 |
| 3,343,089 | 9/1967 | Murphy et al. | 343/701 |
| 3,618,091 | 11/1971 | Butler | 343/701 |

FOREIGN PATENT DOCUMENTS 2229000  1/1974  Fed. Rep. of Germany ............. 455/28

*Primary Examiner*—Jin F. Ng
*Attorney, Agent, or Firm*—Guy W. Shoup; Gerard F. Dunne

[57] ABSTRACT

A microwave receiver is constituted by an antenna having a reflector and a primary radiator, and a converter having an unbalanced input terminal. A core conductor projected from the unbalanced terminal of the converter is extended inside the reflector through a bore formed therein so as to function as the primary radiator of the antenna. The converter is fixed directly to the wall of the reflector.

4 Claims, 3 Drawing Figures

MICROWAVE RECEIVER

BACKGROUND OF THE INVENTION

The present invention relates to microwave receivers. In conventional microwave receivers, the converter and the antenna are installed separately and connected to each other by means of an input connector connected to the antenna, output connector connected to the converter and a coaxial cable therebetween.

Therefore, in such conventional receivers, large losses of signal gain are caused by the cable and the connectors to considerably deteriorate impedance matching.

SUMMARY OF THE INVENTION

It is, therefore, an object of the invention to provide a microwave receiver which can minimize losses in the received signal.

It is another object of the invention to provide a less-expensive microwave receiver having a reduced number of parts.

It is still another object of the invention to provide a microwave receiver in which the converter and the antenna are integrated.

To these ends, according to the invention, there is provided a microwave receiver having an antenna provided with a reflector and primary radiator, and a converter provided with an unbalanced input terminal for receiving the signal from the antenna, wherein the improvement comprises a core conductor extended from the unbalanced input terminal of the converter directly into the reflector, the core conductor thus functioning as the primary radiator of the antenna.

The above and other objects, as well as advantageous features of the invention will become more clear from the following description of the preferred embodiments taken in conjunction with the accompanying drawings.

BRIF DESCRIPTION OF THE DRAWINGS

DESCRIPTION OF THE PREFERRED EMBODIMENT

Figure 1:
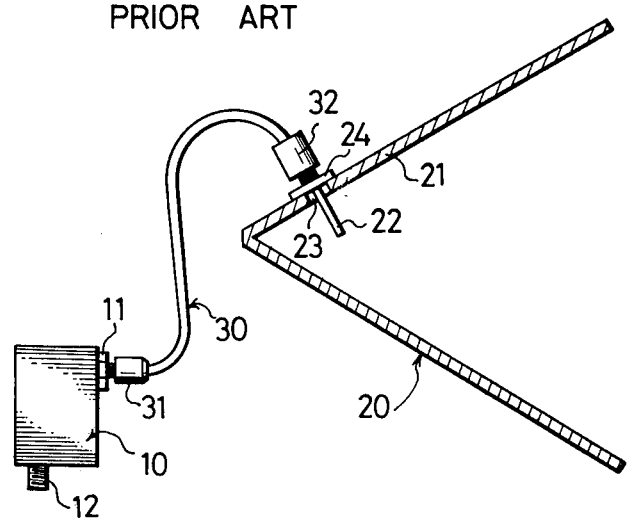
FIG. 1 is a schematic illustration of a conventional microwave receiver.

Before turning to the description of the invention, a typical conventional microwave receiver will be described with specific reference to FIG. 1.

The conventional microwave receiver has a converter 10 and an antenna 20 which are connected to each other by means of a coaxial cable 30. The converter 10 is provided at its input side with an input connector 11 and, at its output side, with an output connector 12.

On the other hand, the antenna 20 is composed of a reflector 21 and a primary radiator 22. The primary radiator 22 is coupled to an antenna connector 24 through a bore 23 formed in the reflector 21. The converter 10 and the antenna 20 are connected to each other by means of a coaxial cable 30 provided at its both ends with connectors 31 and 32.

In the conventional microwave receiver having the described construction, the received signal is transmitted through the coaxial cable 30, connectors 11, 24, 31 and 32, so that considerably large losses in signal gain is caused to deteriorate the impedance matching between the antenna and converter. In addition, the cost of the receiver is raised due to the large number of parts including the coaxial cable and connectors.

Figure 2:
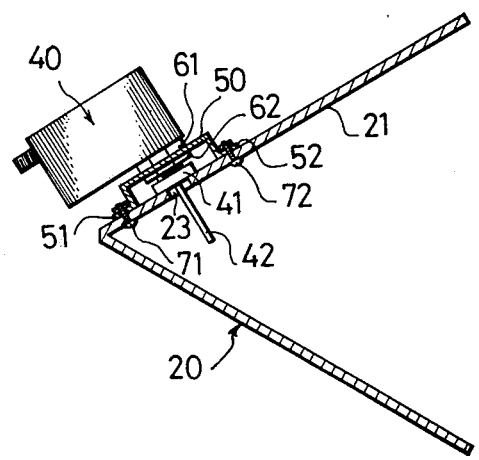
FIG. 2 is a schematic illustration of a microwave receiver embodying the present invention.

Referring now to FIG. 2 showing a microwave receiver of the invention, a converter 40 is directly attached to the antenna 20. An external conductor 41 having a threaded part is fixed to the unbalanced terminal of the converter 40. A conductor 42 extends through this external conductor 41. This conductor 42 is electrically insulated from the external conductor 41, but is electrically connected to a core conductor (not shown) of the input stage of the converter 40. A bracket 50 is provided with a bore for receiving the external conductor 41 of the converter 40.

Nuts 61 and 62 are screwed to the thread of the external conductor so as to clamp it to the bracket 50, thereby to fix the external conductor 41 and the bracket 50 to each other.

The bracket 50 has legs 51 and 52 which are fixed to the outer wall of the reflector 21 of the antenna 20 by means of bolts 71, 72 or rivets. It will be seen that the convertor 40 is intergated with the antenna 20.

The conductor 42 extended from the converter 40 reaches the reflecting region of the reflector 21 through the bore 23 formed in the reflector 21 of the antenna 20, so as to function as the primary radiator of the antenna 20. Therefore, the signal received by the antenna constituted by the primary radiator 42, i.e. the conductor 42, and the reflector 21 is delivered directly to the input stage of the convertor 40 without mediums such as connectors and coaxial cable, and is converted into frequency signals of low frequencies.

Figure 3:
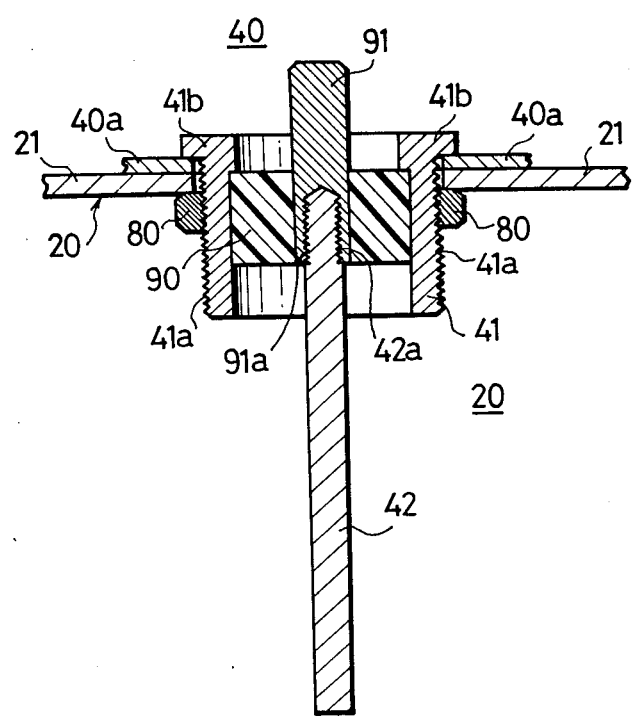
FIG. 3 is a sectional view showing how the microwave receiver of the invention is connected to the reflector of the antenna.

FIG. 3 shows the detail of the input terminal and its vicinity of the microwave receiver of the invention. In FIG. 3, the external conductor 41 is directly attached to the reflector 21 of the antenna 20 by means of a nut 80, without the aid of the bracket 50 shown in FIG. 2.

The external conductor 41 made of brass and plated with silver has a generally cylindrical form. The external conductor 41 is provided at its outer peripheral surface with a threaded part 41a and a flange 41b extending radially outwards from its base portion, and is fixed to the chassis 40a of the converter 40. A spacer 90 made of an insulating material such as Teflon (a registered trademark) is fitted to the inside of the external conductor 41 and holds a holder rod 91 which is made of copper and plated with silver. The holder rod 91 is provided with a threaded bore 91a for receiving the base end of the primary radiator 42.

The primary radiator 42 is a conductor made of copper and plated with silver with its base end portion having a threaded part 42a by at which it is connected to the holder rod 91. The primary radiator 42 is designed to have a length which is ¼ or so of the wavelength of the signal to be received. The holder rod 91 is electrically connected to the core conductor of the input stage of the converter 40.

As has been described, according to the invention, it is possible to avoid the loss of gain attributable to the presence of the coaxial cable and connectors, as well as the deterioration of the impedance matching, because the converter and the antenna are connected integrally to each other. In addition, the number of parts is reduced to lower the cost of production.

From the foregoing description, it will be seen that various changes and modifications may be imparted to the described embodiment, without departing from the scope of the invention. For instance, it is possible to extend the core conductor of the input stage of the converter directly to the outside to make it play the role of the primary radiator provided on the external conductor.

What is claimed is:

1. A microwave receiver having an antenna constituted by a reflector and a primary radiator, and a converter provided with an unbalanced input terminal for receiving the signal from said antenna, wherein the improvement comprises a conductor extending from said unbalanced input terminal of said converter into said reflector of said antenna, so as to constitute said primary radiator of said antenna.

2. A microwave receiver as claimed in claim 1, wherein said unbalanced input terminal includes an external conductor fixed said converter, and said conductor extending through said external conductor and being electrically insulated from the latter.

3. A microwave receiver as claimed in claim 2, wherein said conductor is designed to have a length which is ¼ of the wavelength of the signal to be received.

4. A microwave receiver as claimed in claim 2, wherein said external conductor is fixed to the reflector of said antenna.

* * * * *